United States Patent [19]

Savard

[11] Patent Number: 5,050,699
[45] Date of Patent: Sep. 24, 1991

[54] TRANSMISSION FOR A VEHICLE HAVING AT LEAST ONE DRIVING WHEEL

[76] Inventor: Franck Savard, 22, Rue de Launay, Langueux, France, 22360

[21] Appl. No.: 477,856
[22] PCT Filed: Jun. 12, 1989
[86] PCT No.: PCT/FR89/00297
§ 371 Date: Feb. 13, 1990
§ 102(e) Date: Feb. 13, 1990
[87] PCT Pub. No.: WO89/12571
PCT Pub. Date: Dec. 28, 1989

[30] Foreign Application Priority Data

Jun. 13, 1988 [FR] France ................ 8807859

[51] Int. Cl.⁵ ............................................. B62K 11/00
[52] U.S. Cl. .................................. 180/219; 280/275; 280/276; 280/277; 280/279
[58] Field of Search ............... 180/219; 280/275, 276, 280/277, 279

[56] References Cited

U.S. PATENT DOCUMENTS

| 4,671,375 | 6/1987 | Oike et al. | 180/227 |
| 4,828,069 | 5/1989 | Hatsuyama | 180/219 |
| 4,842,091 | 6/1989 | Bodsey | 180/219 |

FOREIGN PATENT DOCUMENTS

| 207618 | 1/1987 | European Pat. Off. | 180/219 |
| 2820882 | 11/1978 | Fed. Rep. of Germany | 180/219 |
| 2579950 | 10/1986 | France | 180/219 |
| 2594401 | 8/1987 | France | 180/219 |
| 212681 | 8/1989 | Japan | 180/219 |
| 244993 | 9/1989 | Japan | 180/219 |
| 301485 | 12/1989 | Japan | 180/219 |
| 2049579 | 12/1980 | United Kingdom | 180/219 |

Primary Examiner—Charles A. Marmor
Assistant Examiner—Alan M. Kagen
Attorney, Agent, or Firm—Wenderoth, Lind & Ponack

[57] ABSTRACT

A vehicle includes a frame, at least one front wheel, at least one rear wheel, a motor mounted on the frame and operatively connected to drive the front wheel and the wheel rear, and the gearbox connected to the motor and having an output shaft. A front suspension arm operatively supports the front wheel and is pivotally mounted about the output shaft for pivotal movement in the plane of the front wheel. A rear suspension arm operatively supports the rear wheel and is pivotally mounted about the output shaft of the gearbox for pivotal movement in the plane of the rear wheel.

9 Claims, 3 Drawing Sheets

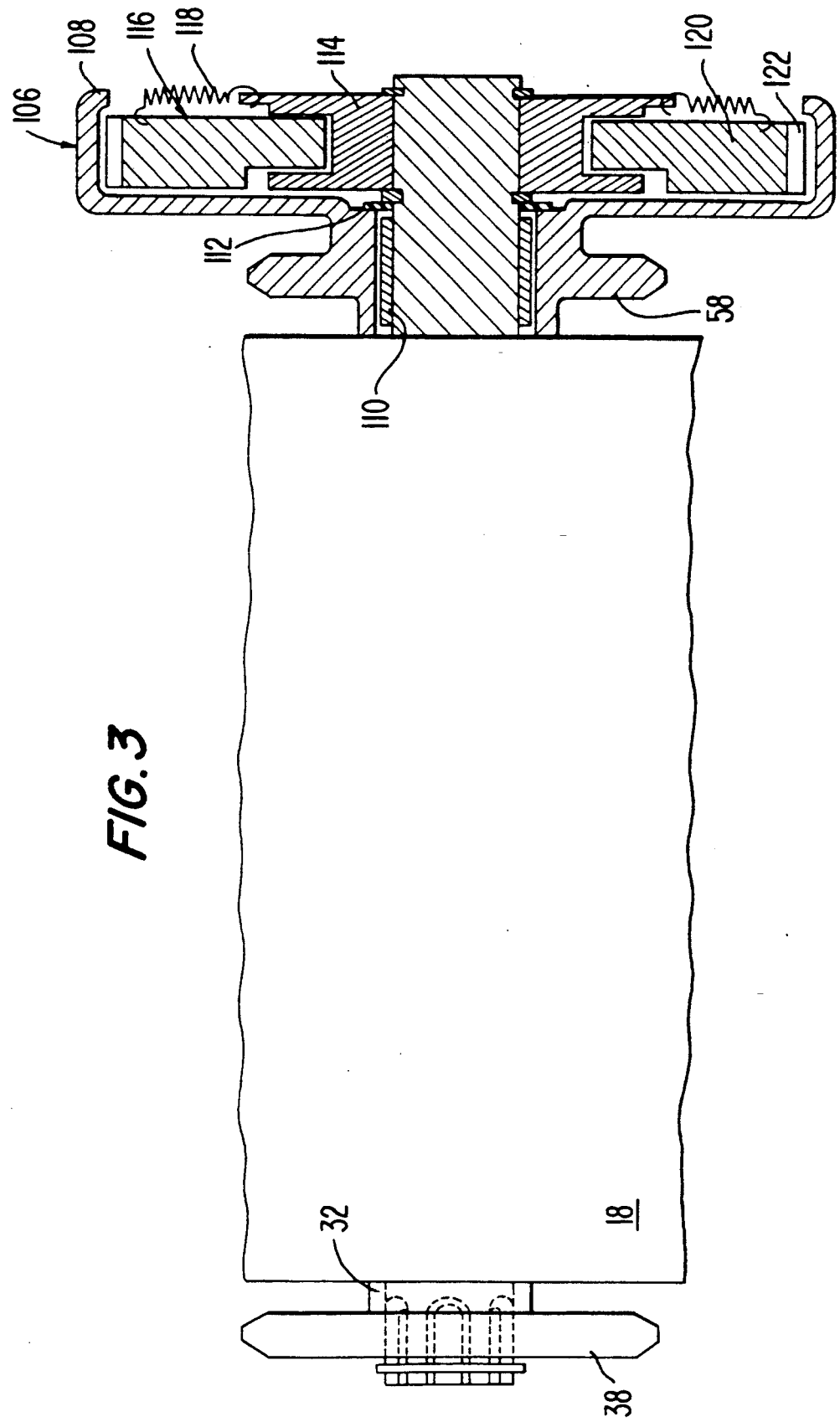

TRANSMISSION FOR A VEHICLE HAVING AT LEAST ONE DRIVING WHEEL

BACKGROUND OF THE INVENTION

The present invention relates to a vehicle having two wheels, an engine which drives at least one of the wheels, a gearbox, a frame connected to the engine and two front and rear suspension arms of the pivotal type.

A vehicle is known which comprises driving wheels capable of being uncoupled and a device for adjusting the castor and the castor angle of the front wheel and is described in PCT/FR88/00073.

More particularly, in the case of the described vehicle having two wheels, two synchronous and distinct driving shafts are provided, one for rear wheel and the other for the front wheel. The suspensions are of the type having a pivotal arm and a pivot axis of each of these arms is distinct from the axis of the driving shafts. This makes it necessary for example in the case of a chain transmission, to require a tightener for compensating for the tension of the chain upon movements of the arm. Moreover, the weight of the different transmission elements is great. Also, reliability is reduced bearing in mind that the number of moving parts is large and the useful power may be reduced, in particular by losses due to friction.

Furthermore, the steering unit comprises a steering column driven in rotation at one end by a handlebar and connected at its other end to a compass system itself articulated to a front steering fork, the latter being fixed to an inner hub which is rotatably mounted to be steerable on a pin carried by a pivot connected to the pivotal arm.

In order to facilitate the steering orientation of the front wheel, the articulations are of the universal type, but this results in particular in an increase in weight, a reduction in handling and reliability, a higher cost and increased maintenance.

SUMMARY OF THE INVENTION

A vehicle having two wheels according to the invention comprises a suspension having pivotal arms which avoids the mounting of a device for automatically taking up the differential play in transmissions during their movements, while reducing the number of moving parts and which allows the mounting of a simple and effective clutch release for the front wheels, a multi-use frame, and a steering unit which includes a compass system and has a reduced number of parts.

For this purpose, the invention provides a vehicle comprising at least two wheels, a motor which drives at least one of the wheels, a gearbox, a frame connected to the motor and two front and rear suspension arms of the pivotal type fixed to the motor at respective first ends, characterized in that at least one of the pivotal arms is mounted to be pivotable relative to the motor about an output shaft of the gearbox.

Furthermore, the invention is characterized in that the front wheel comprises driving means with a clutch release device, in particular of the centrifugal type mounted coaxially with the output shaft of the gearbox.

The vehicle according to the invention is further characterized in that the frame comprises at least two tubes interconnected at first ends and connected at second ends to the motor so as to form a frame, these tubes being capable of being employed as an air supply intake for the motor.

BRIEF DESCRIPTION OF THE DRAWINGS

The invention will be described with respect to a particular embodiment with reference to the accompanying drawings, in which:

FIG. 3 represents a sectional view of an output shaft of a gearbox and of a clutch release device.

DETAILED DESCRIPTION OF THE INVENTION

Figure 1:
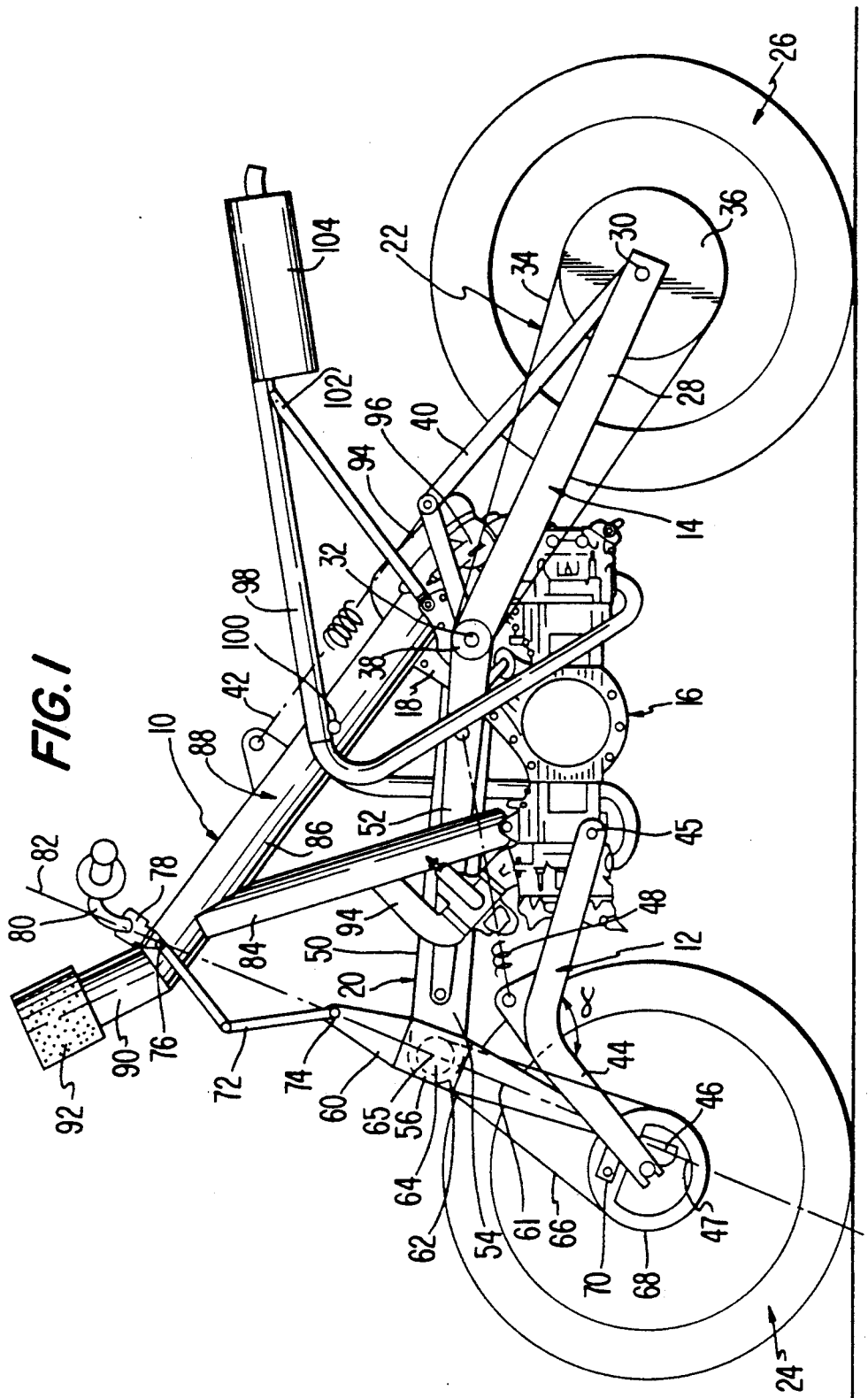
FIG. 1 represents a side elevational view of a vehicle having two wheels according to the invention.

The invention having two wheels according to the invention comprises a frame 10, two front 12 and rear 14 swing or pivotal arms, a motor 16 having a gearbox 18, two transmissions 20, 22 respectively driving the front wheel 24 and rear wheel 26.

The rear pivotal arm 14 comprises a rear fork 28 on one of the ends of which is mounted a spindle 30 of the rear wheel 26 while the other end is rotatably mounted coaxially with an output shaft 32 of the gearbox. The transmission 22 is of the type having a chain 34, a chain wheel 36 and a gearbox output sprocket 38, as shown in more detail in FIG. 3. The suspension of the rear pivotal arm is provided by a deformable articulated lever arm or compass system 40 whose movements are controlled by a shock absorber 42. The front pivotal arm 12 is of the deformable quadrilateral type comprising a lower fork 44 having one end articulated to a pin 45 relative to the motor 16 and the other end fixed to the ends of a steering pivot 46. A shock absorber 48 controls the displacements of lower fork 44 and is disposed between the lower fork 44 and a reinforcement 52 of a strut 50 which will be described subsequently. This arrangement results in a progressivity of the shock-absorbing effect, since there is a variation in the orientation of the shock absorber when the quadrilateral is deformed.

Lower fork 44 has a special "boomerang" shape defining an obtuse angle, facing downwardly so that the rectilinear part of the fork which is fixed to the pivot 46 has a length substantially equal to the length of the radius of the front wheel 24.

The front pivotal arm 12 futher comprises the strut 50 with the reinforcement or stiffener 52, the strut being employed as a protective case for the transmission 20 driving the front wheel. Strut 50 is at one of its ends rotatively mounted coaxially with the output shaft 32 of the gearbox 18. Transmission 20 is of the type having a chain 54, a chain wheel 56 and a sprocket 58. The mounting of the sprocket 58 on the output shaft 32 of the gearbox 18 is shown in detail in FIG. 3.

The other end of the strut 50 is articulated to a steering fork 60 so that the latter is free to rotate about an axis 61 and about an axis 65 which is the axis of rotation of the chain wheel 56. The chain wheel 56 drives through a universal joint 62 a sprocket 64 which cooperates with a chain 66 engaged on a driving chain wheel 68 connected to an outer part of the hub, of wheel 24 that is movable in rotation about an inner hub relative to the pivot 46 about a pin 47.

The steering fork 60 is also fixed at its lower part 70 to the inner hub and is articulated at its upper part to an end of a lever arm or compass system 72 about a first pin 74.

Compass system 72 is itself articulated at its other end to a second pin 76 parallel to the first pin 74 on a steering column 78 surmounted by a control handlebar 80.

Steering column 78 is mounted to be freely rotatable about an axis 82 relative to the frame 10 on which it is fixed. The dimensions and the orientations of the different elements of the steering unit are such that the articulation points 76, 74, 65 and 46 respectively of the steering column 78, the compass system 72, the front steering fork 60 and the steering pivot pin 47 of the front wheel 24 relative to the pivot 46 are in alignment.

The frame 20 comprises at least two tubes 84, 86 interconnected at first ends and having second ends connected to the motor so as to form a frame 88.

In the upper part of the frame 88 there is provided an air supply intake 90 surmounted by a filter 92 substantially at the height of the handlebar. Each tube 84, 86 comprises an air supply sleeve 94 connecting the tube to the motor 16 and more particularly to a carburetor 96.

The frame 10 further comprises an exhaust pipe 98 which extends up from the motor 16, is fixed to the frame 88 at 100 and extends rearwardly to such height, relative to the ground, that it is capable of receiving a saddle (not shown for the sake of clarity).

A stiffener 102 is disposed substantially between the end of the exhaust pipe and the motor 16 to reinforce the frame. In a known manner, the end of the exhaust pipe is completed by a muffler 104.

Figure 2:
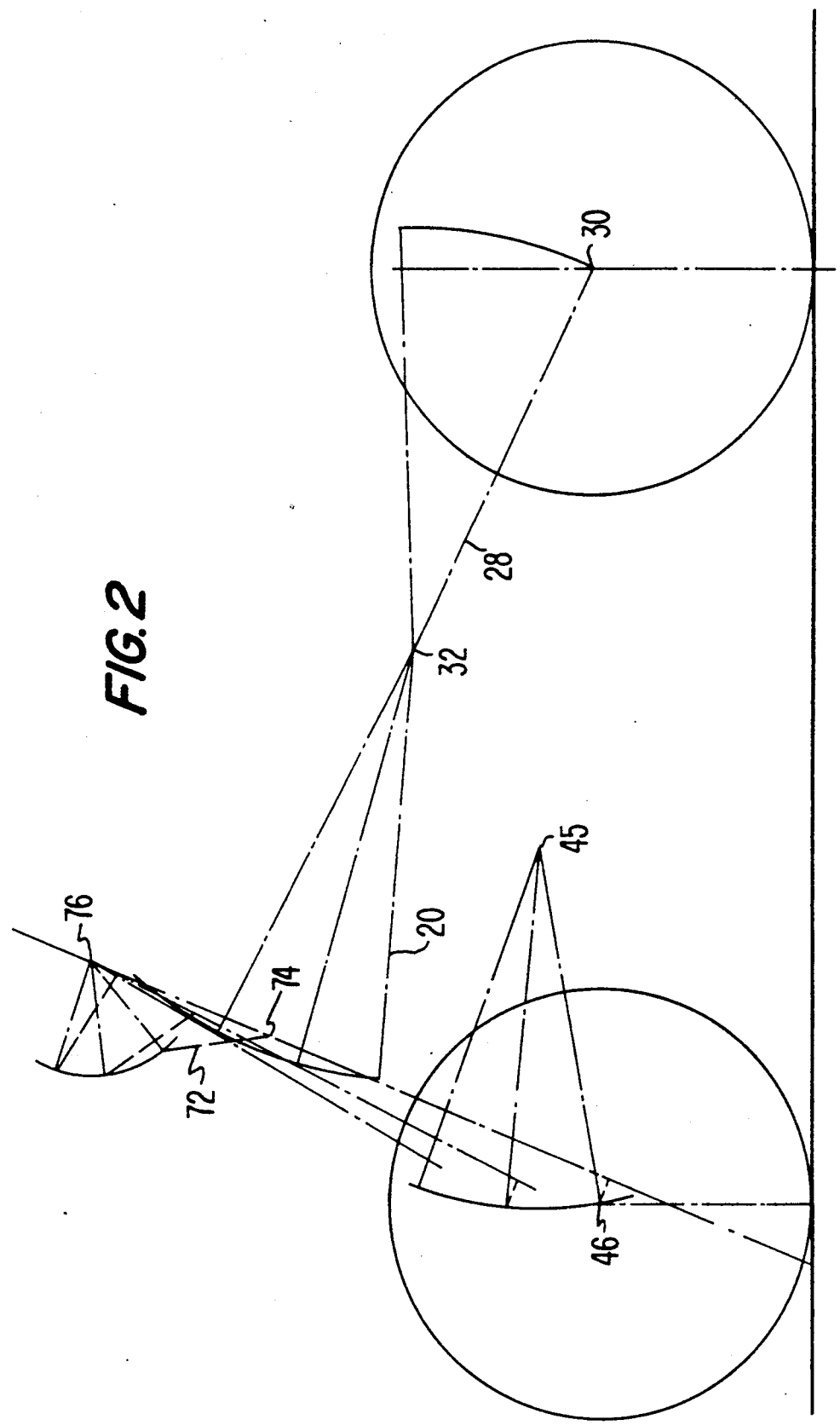
FIG. 2 represents a diagram of displacements of moving elements of the vehicle.

The operation of the pivotal arms and the displacements of the principal elements of which they are composed is represented diagrammatically in FIG. 2.

The lower fork 44 of the pivotal arm 12 pivots about the pin 45 in a plane parallel to the plane containing the wheel and can assume various positions represented by dot-dash lines.

Likewise, the strut 50 pivots about the output shaft 32 of the gearbox and can assume various positions represented by dot-dash lines.

The compass systems 72 compensates for the variations in distance between the steering fork 60 and the lower end of the steering column 78.

The constant alignment of the articulation points 76, 74, 65 and the pin 46 permits the compass system to be connected directly to the steering colum 78 without the necessity of providing universal joint assemblies at each articulation point.

Moreover, the strut 50 of the deformable quadrilateral forming the front pivotal arm 12 pivots about the shaft 32, and the distance between the sprocket 38 and the chain wheel 36 remain constant 36. The position of the shaft 32 is defined in accordance with parameters such as wheelbase, castor, castor angle. Thus, once the parameters are chosen, the point 32 is unique.

FIG. 3 represents a clutch release device 106 for uncoupling the drive of the front wheel. Device 106 is disposed coaxially of the shaft 32 and 106 is of the centrifugal type.

The sprocket 58, connected to a bell member 108, is mounted to freely rotate on the shaft 32 by means of a bearing 110 and is maintained fixed in translation relative to the shaft 32 by an elastic ring 112.

An annular flange 114, mounted with a tight fit on the shaft 32, carries shoes 116 which are radially movable relative to flange 114 and are biased toward the latter by springs 118. The shoes 116 comprise in the known manner a metal weight 120 to the end of which is fixed a friction liner 122.

The operation of this clutch device is for example as follows.

At low speed, the shaft 32 has a low speed of rotation which does not enable the centrifugal force imparted to the weights 120 by the speed of rotation to overcome the return force exerted by the springs 118. Thus, only the rear wheel is driven.

When the rear wheel loses its adherence and slips, or when the speed of rotation of the output shaft of the gearbox increases, the shoes 116 move away from the flange 114, the liners 122 come into contact with the bell 108 and create a sufficient friction to cause driving of the bell and simultaneously the driving of sprocket 58. Thus, both the front and rear wheels are driven.

The vehicle according to the invention affords many advantages, in particular that of providing a constant adjustment of the tension of the chain, which results in an improved chain-sprocket-chain wheel cooperation, an improved flexibility in the transmission, an improved reliability and an improved efficiency of the transmission.

The frame is also simplified and lightened owing to the multiple functions of certain elements, such as the pivotal arms and the exhaust pipe. The frame provides moreover improved air intake which occurs at a greater height while remaining easily accessible without requiring a complementary assembly element.

The "boomerang" shape of the fork 44 provides, in combination with the simplification of the steering unit by the elimination of universal joints, an increased angular movement.

The movement has been described with regard to a particular embodiment, but the invention concept may be applied to vehicles having three or four wheels, more commonly called ATC.

I claim:

1. A vehicle comprising:
   a frame;
   at least one front wheel;
   at least one rear wheel;
   a motor mounted on said frame and operatively connected to drive said front wheel and said rear wheel;
   a gear box connected to said motor and having an output shaft;
   a front suspension arm operatively supporting said front wheel and pivotally mounted about said output shaft for pivotal movement in the plane of said front wheel; and
   a rear suspension arm operatively supporting said rear wheel and pivotally mounted about said output shaft for pivotal movement in the plane of said rear wheel.

2. A vehicle as claimed in claim 1, wherein said front suspension arm is a deformable quadrilateral assembly comprising a front steering fork with an upper part and a lower part, a lower fork articulated to said motor and rotatably mounted relative to said lower part of said front steering fork, and a strut articulated to said upper part of said front steering fork and pivotally mounted relative to said gearbox whereby an assembly of said motor and said gearbox forms a fourth side of said quadrilateral assembly.

3. A vehicle as claimed in claim 2, wherein said strut is pivotally mounted coaxially about said output shaft of said gearbox.

4. A vehicle as claimed in claim 2, wherein said strut comprises a case including a first chain, a chain wheel and a sprocket of a transmission connected to and driving said front wheel.

5. A vehicle as claimed in claim 4, wherein said sprocket is fixed to said output shaft of said gearbox.

6. A vehicle as claimed in claim 5, wherein said chain wheel is connected to another sprocket through a universal joint to drive a second chain and another chain wheel of said transmission of said front wheel.

7. A vehicle as claimed in claim 4, wherein said transmission comprises a clutch release device for uncoupling drive to said front wheel.

8. A vehicle as claimed in claim 7, wherein said clutch release device is of the centrifugal type and is mounted coaxial with said output shaft of said gearbox so as to vary drive to said front wheel as a function of driving performance of said rear wheel.

9. A vehicle as claimed in claim 2, wherein said strut includes lateral stiffeners.

* * * * *